United States Patent [19]

Koch et al.

[11] Patent Number: 5,081,215

[45] Date of Patent: Jan. 14, 1992

[54] PREPARATION OF POLYARYLENEETHERKETONES

[75] Inventors: Juergen Koch, Neuhofen; Wolfgang Stegmaier, Hassloch; Gerhard Heinz, Weisenheim, all of Fed. Rep. of Germany

[73] Assignee: BASF Aktiengesellschaft, Ludwigshafen, Fed. Rep. of Germany

[21] Appl. No.: 393,793

[22] Filed: Aug. 15, 1989

[30] Foreign Application Priority Data

Aug. 31, 1988 [DE] Fed. Rep. of Germany ....... 3829520

[51] Int. Cl.$^5$ ..................... C08G 8/02; C08G 14/00; C08G 85/00; C08F 2/00
[52] U.S. Cl. .................................... 528/125; 528/126; 528/128; 528/219; 526/65; 526/66
[58] Field of Search ............... 528/125, 126, 128, 219; 526/65, 66

[56] References Cited

U.S. PATENT DOCUMENTS

| | | | |
|---|---|---|---|
| 3,441,538 | 5/1969 | Marks | 528/125 |
| 3,637,592 | 1/1972 | Berr | 528/194 |
| 3,953,400 | 4/1976 | Dahl | 528/179 |
| 3,956,240 | 5/1976 | Dahl | 528/125 |
| 4,843,131 | 6/1989 | Becker et al. | 526/65 |
| 4,874,840 | 10/1989 | Becker | 328/125 |
| 4,912,181 | 3/1990 | Becker et al. | 526/65 |

FOREIGN PATENT DOCUMENTS 1383393 2/1975 United Kingdom .

8403892 10/1984 World Int. Prop. O. .

OTHER PUBLICATIONS

"Chemical Reaction Theory-An Introduction", Stickstoffbücherei, 3rd ed., K. G. Denbigh et al., Cambridge University Press, London, pp. 1-5-et seq.

*Primary Examiner*—John Kight, III
*Assistant Examiner*—P. Hampton-Hightower
*Attorney, Agent, or Firm*—Oblon, Spivak, McClelland, Maier & Neustadt

[57] ABSTRACT

Polyaryleneetherketones are prepared by a quasicontinuous process, by Friedel-Crafts polycondensation of a reaction mixture containing A. a monomer system of
  (a)
    (1) an aromatic dicarboxylic acid chloride or phosgene and
    (2) a polynuclear aromatic having two exchangeable hydrogen atoms and/or
  (b) a polynuclear aromatic carboxylic acid chloride having one exchangeable hydrogen atom,
B. a Lewis acid,
C. if necessary, a Lewis base and
D. an inert solvent.

The reaction mixture is subjected to polycondensation in a first zone, with stirring, to a viscosity of not more than 2,000 mPa.s, then conveyed through a second, vertical, unstirred zone with plug flow by means of gas pressure, where the polycondensation is completed, and is finally discharged continuously.

6 Claims, 1 Drawing Sheet

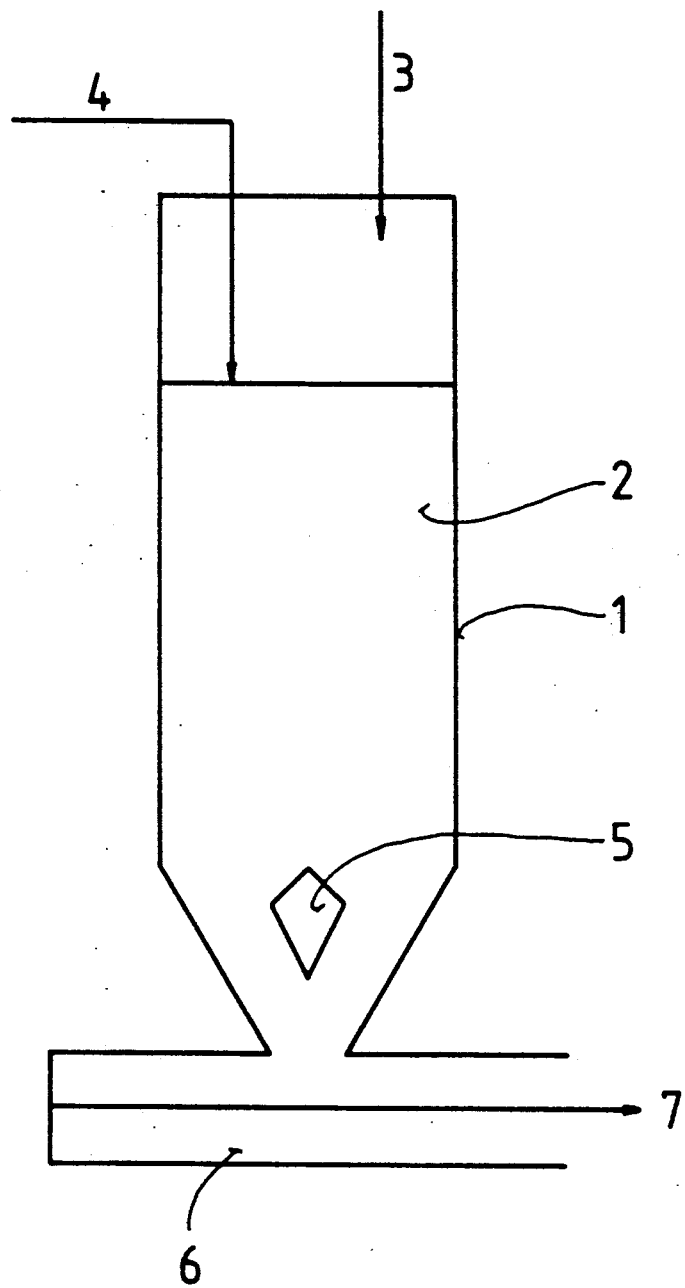

PREPARATION OF POLYARYLENEETHERKETONES

The present invention relates to a process for the preparation of polyaryleneetherketones by electrophilic polycondensation in two reaction zones.

Polyaryleneetherketones are high quality thermoplastics which have particularly good heat resistance, great toughness, very good mechanical properties and resistance to chemicals and solvents.

Polyaryleneetherketones can be prepared by either nucleophilic or electrophilic substitution reactions.

In the electrophilic polycondensation, either
a) a monomer mixture consisting of an aromatic dicarboxylic acid chloride or phosgene and a polynuclear aromatic having exchangeable hydrogen atoms or
b) a polynuclear aromatic acyl chloride having a reactive hydrogen atom
is converted in the presence of a Friedel-Crafts catalyst. According to U.S. Pat. Nos. 3,441,538, 3,953,400 and 3,956,240, boron trifluoride in hydrogen fluoride as a solvent is employed.

According to WO 84/03892, it is possible to use less corrosive solvents, for example methylene chloride or dichloroethane, if a Lewis acid, for example aluminum trichloride, preferably together with a Lewis base, for example lithium chloride or dimethylformamide, is used as the catalyst.

This process variant avoids the use of HF and $BF_3$, permits the polycondensation to be carried out at low temperatures and gives a gel-like reaction material which is easier to handle than the hard reaction products which are formed in the absence of a Lewis base.

The polycondensation is carried out by a procedure in which the starting compounds are added in succession to a stirred and temperature controlled suspension of aluminum chloride in the solvent. The polycondensation reaction leads to a pronounced increase in viscosity.

When the process is scaled up to the industrial scale, it is found that in many cases the reaction material is so highly viscous that it can no longer be stirred and discharged from the reactor.

It is an object of the present invention to improve the known process so that the resulting reaction material can be handled even when the procedure is carried out on an industrial scale.

We have found that this object is achieved if the polycondensation is carried out in two reaction zones, and the reaction mixture is subjected to polycondensation in the first zone, with stirring, to a viscosity of not more than 2,000 mPa.s and is then conveyed through a second, vertical zone with plug flow by means of gas pressure, where the polycondensation is completed under substantially adiabatic conditions.

The individual components of the reaction mixture are described in detail in WO 84/03892, which is hereby incorporated by reference.

A. Preferred monomer systems A are:

a1) terephthaloyl chloride and 4,4'-diphenoxybenzophenone, which leads to a polyaryleneetherketone of the structure

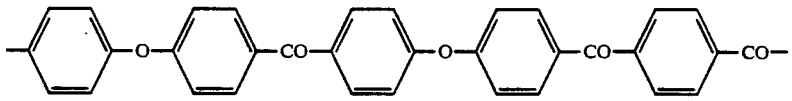

a2) terephthaloyl chloride and 1,4'-diphenoxybenzene, which leads to

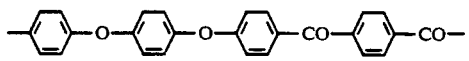

a3) terephthaloyl chloride and 1,4-bis-(phenoxybenzoyl)-benzene, which leads to

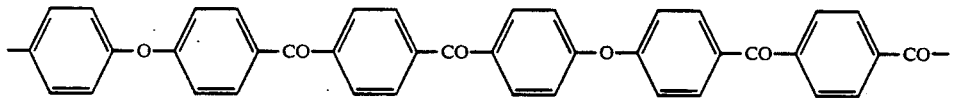

The aromatic dicarboxylic acid chloride and the polynuclear aromatic are used in essentially equimolar amounts, small deviations being permissible in order to obtain the required molecular weight.

b) The polycondensation of p-phenoxybenzoyl chloride with itself leads to

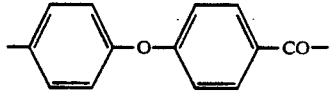

c) Monofunctional reagents for chain termination are, for example, benzoyl chloride and p-phenoxybenzophenone. They are particularly important for the polycondensation of the monomers b) for obtaining the required molecular weight; they are also used for stabilizing the polymers in the melt. They are employed in general in amounts of from 1 to 10 mol %, based on the monomers a) or b).

B. A preferred Lewis acid is aluminum chloride, and aluminum bromide, antimony pentachloride, boron trifluoride, zinc chloride, iron(III) chloride, titanium tetrachloride and tin(II) chloride are also suitable. They are used in an amount of not less than one mole per nucleophilic group in the reaction mixture, it being necessary to use a small excess, preferably from 5 to 30 mol %, which is sufficient to catalyze the polycondensation reaction.

C. The reaction mixture preferably contains a Lewis base, for example an alkali metal halide, such as LiCl or NaCl, and polar organic compounds, such as N-methylpyrrolidone, N,N-dimethylformamide, 1-methyl-2-pyrrolide, dimethyl sulfone, diphenyl sulfone, tetramethylene sulfone (sulfolane), dimethyl sulfide, imidazole, benzophenone and trimethylamine. LiCl and dimethyl sulfone are preferred. They are used in amounts of from 0.01 to 4 moles per mole of acid groups.

D. Suitable inert solvents are: methylene chloride, o-dichlorobenzene, 1,2,4-trichlorobenzene, 1,2-dichloroethane and 1,1,2,2-tetrachloroethane.

The polycondensation is usually carried out at from −70° to +150° C. Advantageously, it is initiated in the first reaction zone at low temperatures, for example from −50° to −10° C., and the temperature is then allowed to increase to, for example, −30° to +30° C. The entire reaction should be carried out at least under slightly superatmospheric pressure, advantageously above 1.1, in particular from 2 to 10, bar, in order to prevent escape of the resulting hydrogen chloride and hence foaming. This is also important in the transfer from the first to the second reaction zone. For transferring the prepolymer from the stirred preliminary reactor to the downstream reactor, it is advantageous if the pressure maintained in the preliminary reactor is higher than that in the downstream reactor. It may be useful to reduce the pressure in the downstream reactor slightly during introduction of prepolymer into the said reactor. However, the pressure should not be reduced to such an extent that the reaction material foams.

Mixing of the liquid and solid reaction components and the prepolymerization are carried out in the first reaction zone with stirring, expediently in a cooled stirred kettle which advantageously consists of a corrosion-resistant alloy, for example Hastelloy. The initial viscosity is about 0.5 mPa.s. Polycondensation is carried out in the first reaction zone until the viscosity has increased to 20-2,000, preferably 50-200, mPa.s. In the case of the polycondensation of terephthaloyl chloride with diphenoxybenzophenone, this takes about 15-25 minutes from the addition of the final monomer.

The prepolymer is then introduced directly into the second reaction zone. This is done by means of gravity and/or inert gas pressure. The viscosity during transfer of the prepolymer to the downstream reactor should be sufficiently high to prevent the aluminum chloride from settling out in the downstream reactor; otherwise a high molecular weight polyetherketone will not be formed. It should, however, be sufficiently low to permit complete transfer of the prepolymer to the downstream reactor.

BRIEF DESCRIPTION OF THE DRAWINGS

In the simplest case, the downstream reactor of the second reaction zone consists of a simple vessel. In industrial-scale plants, however, a vertical, cylindrical, unstirred tube reactor having an l:d ratio of from 2:1 to 10:1 is preferred, in order to be able to handle the highly viscous polymer in a closed apparatus and to be able to discharge it for further working up.

The Figure shows such a tube reactor schematically. It consists of a reaction tube (1) which contains the reaction material (2). A displacement apparatus (5) may be installed at its lower conical end. The prepolymer (3) is introduced batchwise from the preliminary reactor into the reaction tube and conveyed downward continuously by means of gas pressure (4). The polymer is forced out (7) by a discharge aid (6) and can then be comminuted. The tube reactor may be constructed in any size, and the ratio of its volume to the volume of the preliminary reactor is made to correspond to the ratio of the residence times of the reaction material in the two reaction zones. Since the reaction material is conveyed through the reaction tube by means of gas pressure, the said reaction tube has no hydraulically operated parts. The lower end of the reaction tube advantageously tapers conically (see Figure) and ends in a discharge aid. The latter may consist of a vertical or, preferably, horizontal screw unit by means of which the reaction material is forced out, and a perforated disk may be mounted on the screw, permitting preliminary comminution of the reaction material. The discharge aid can, however, also be a star wheel or a vertical, movable piston.

To obtain uniform product quality, in particular with regard to the degree of polymermaterial, the reaction must pass through the tube reactor with plug flow, from the point of entry into the tube reactor to the point of discharge from the said reactor. The following measures are advantageous for ensuring this:

a) Coating of the inner wall of the tube reactor and of the feed lines and discharge lines with a low-friction material which is inert to the reaction material and antiadhesive, for example polytetrafluoroethylene (PTFE), polyvinylidene fluoride (PVDF), perfluoroethylenepropylene (FEP) or other coatings or linings having appropriate properties.

(b) Installation of an apparatus at the end of the cylindrical area, which apparatus is preferably in the form of a conical or double-cone displacer or in the form of a perforated plate or concentric rings. This prevents the reaction material from flowing out only in the region around the longitudinal axis in the discharge area.

The downstream reactor possesses, at the upper end, a feed for compressed gas, which has three objects:

a) Producing an inert gas volume above the reaction material.

b) Building up pressure to prevent the reaction material from foaming.

c) Moving the reaction material with plug flow to the discharge aid in the lower part of the reactor.

The reaction tube is advantageously provided with a jacket through which liquid flows or with another suitable apparatus for temperature control.

The mode of operation of this reactor, starting from a reactor already filled with prepolymer, may be described as follows.

A) By means of gas pressure, preferably with nitrogen, the reaction material is forced continuously with plug flow toward the discharge aid in the conical part of the reactor. From there, the reaction material is discharged by the discharge aid into a downstream working-up unit. There, preliminary comminution takes place.

B) The volume which becomes available in the tube reactor is filled at regular time intervals by introduction of prepolymer. In the optium case, the same amount is discharged continuously as is introduced batchwise at the upper end of the tube reactor, so that the amount of reaction mixture present in the reactor remains on average constant. The level of the reactor content should be such that the time from introduction to discharge is sufficient to achieve the desired molecular weight. The intrinsic viscosity (measured for 0.5 g/100 ml in $H_2SO_4$) of the polymer prepared should preferably be from 0.5 to 1.6.

The amount of reaction product fed to the downstream working-up unit can be varied in a simple manner by changing the rotary speed of the discharge screw, and remains very substantially constant with time. Since preliminary comminution of the reaction material takes place in the discharge screw, the downstream comminution unit is relieved.

The residence time in the second reaction zone is in general from 3 to 8, preferably from 4 to 5, hours.

EXAMPLE 1

In a 2 l pressure vessel, 580 g (4.35 moles) of aluminum chloride are suspended in 840 ml of dry methylene chloride and the suspension is cooled to below 0° C. 112.96 g (1.20 moles) of dimethyl sulfone, 162.42 g (0.8 mole) of terephthaloyl chloride and 4.05 g (0.029 mole) of benzoyl chloride are added in succession while cooling. After the mixture has been cooled to $<-10°$ C., 298.41 g (0.814 mole) of 4,4'-diphenoxybenzophenone are also added. The vessel is then provided with a gastight seal and nitrogen under about 3 bar is forced in to maintain the pressure. With slow heating, the viscosity increases to 100 mPa.s in the course of about 20 minutes. The temperature is then about 18° C. During this precondensation time, the inert gas pressure in the reaction vessel is increased to about 10 bar.

The volume of the prepolymer is about 1,500 ml.

By means of the applied nitrogen pressure, the reaction mixture is then discharged through the base outlet valve in the course of 5 minutes and transferred to the downstream reactor via a pressure-resistant tube coated on the inside with PTFE.

The procedure is repeated and the resulting prepolymer is transferred to the downstream reactor at intervals of one hour.

The diameter of the downstream reactor is 150 mm and the length of the cylindrical part is about 500 mm. The volume is thus about 8,800 cm³. A double-cone displacer element is mounted by means of three webs in the transition from the cylindrical to the conical part of the reactor. All surfaces of the tube reactor which come into contact with the product are coated with PTFE.

A Hastelloy C4 discharge screw which is driven by an electric motor, has a diameter of 40 mm and discharges at right angles to the axis of the reaction tube is mounted in the lower, conical part of the downstream reactor. A perforated plate having 4 mm holes and a rotating scraper is mounted at the discharge orifice of the screw.

The downstream reactor is operated in such a way that 1,500 ml of reacted material are discharged per hour. This is the same amount as that which is introduced batchwise in the form of prepolymer into the downstream reactor.

The temperature in the downstream reactor is 25° C., the pressure is 5 bar and the mean residence time is 5 hours.

The discharged reaction material is worked up by means of a hammer mill, 200 l/h of water being sprayed in to hydrolyze the polymer/aluminum chloride complex. With a throughput of 1,500 ml of polymer per hour, the power consumption of the mill is 0.6 kW.

The polymer is then freed of catalyst residues by repeated extraction with water and is dried under reduced pressure at 200° C.

The resulting polymer has an intrinsic viscosity of 1.07 (measured at 25° C. in concentrated sulfuric acid, 0.5 g/100 ml).

With the aid of the apparatus described in this Example, it is also possible to maintain continuous operation of the downstream reactor and working-up unit over a prolonged period.

The resulting polymer has the structure

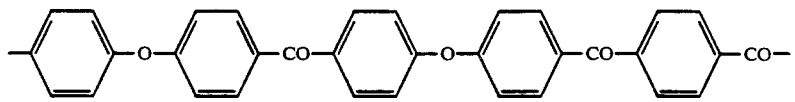

Its glass transition temperature is 175° C. and its melting point is 375° C.

EXAMPLE 2

In a 1 l pressure vessel, 300 ml of dry 1,2-dichloroethane are initially taken and cooled to $-30°$ C. 400 g (3 moles) of aluminum chloride, 31.79 g (0.75 mole) of lithium chloride and 54.83 g (0.75 mole) of dry dimethylformamide are slowly added in succession, while cooling. The mixture is recooled to $-20°$ C., after which a mixture of 167.75 g (0.750 mole) of p-phenoxybenzoyl chloride, 0.633 g (0.450 mole) of benzoyl chloride, 1.234 g (0.0450 mole) of p-phenoxybenzophenone and 130 ml of 1,2-dichloroethane is added dropwise in the course of 15 minutes. During this procedure, the temperature is kept below $-5°$ C. by cooling. The pressure vessel is then closed and nitrogen is forced in to a pressure of 5 bar. After about 50 minutes, the viscosity of the prepolymer has reached about 100 mPa.s. The prepolymer is transferred to the downstream reactor described in Example 1 via the base outlet valve and a PTFE-lined pressure tube. The volume of the prepolymer is about 700 ml per batch.

The downstream reactor is filled with the prepolymer at intervals of 2 hours. The downstream reactor is temperature controlled at 0° C. by means of the jacket through which liquid flows. After the downstream reactor has been completely filled, 350 ml of polymer per hour are discharged continuously at the lower end. Introduction of fresh prepolymer is continued. The discharged reaction material is worked up in a hammer mill as described in Example 1. After repeated extraction with water, the resulting polymer is dried under reduced pressure. The yield is 84 g per hour.

The polymer obtained has the structure

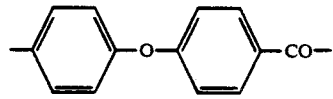

and has a glass transition temperature of 165° C. and a melting point of 365° C. The intrinsic viscosity (0.5 g/100 ml in concentrated sulfuric acid at 25° C.) is 1.1.

We claim:

1. A process for the preparation of a polyaryleneetherketone by Friedel-crafts polycondensation of a reaction mixture containing
A. a monomer system of
   (a)
      (1) an aromatic dicarboxylic acid chloride or phosgene and (2) an essentially equimolar amount of a polynuclear aromatic which contains two hydrogen atoms exchangeable by electrophilic substitution (b) a polynuclear aromatic carboxylic acid chloride which has a hydrogen atom exchangeable by electrophilic substitution and is capable of undergoing condensation with itself, or (c) a mixture of (a) and (b), B. a Lewis acid in an amount of not less than one mole per nucleophilic group in the reaction mixture and in addition a small excess which is sufficient to catalyze the reaction, and C. a solvent which is inert under reaction conditions, wherein the reaction mixture is subjected to polycondensation in a first reaction zone, with stirring, to a viscosity of not more than 2,000 mPa.s and is then conveyed through a second, vertical reaction zone with plug flow by means of gas pressure acting directly upon the reaction material, where the polycondensation is completed.

2. A process as claimed in claim 1, wherein the polycondensate from the second reaction zone is discharged continuously by a conveying unit.

3. A process as claimed in claim 1, wherein the first reaction zone is a cooled stirred kettle, and the second reaction zone is a vertical, cylindrical, unstirred tube reactor.

4. A process as claimed in claim 1, wherein a Lewis base in an amount of from 0.01 to 4 moles per mole of acid group is additionally present during the polycondensation.

5. A process as claimed in claim 2, wherein the polycondensate is discharged continuously from the second reaction zone by a horizontally arranged screw unit.

6. A process as claimed in claim 1, wherein a monofunctional reagent for blocking the terminal groups is additionally present during the polycondensation.

* * * * *